(12) United States Patent
Naito

(10) Patent No.: US 10,682,603 B2
(45) Date of Patent: Jun. 16, 2020

(54) CARBON DIOXIDE RECOVERY METHOD AND RECOVERY DEVICE

(71) Applicant: IHI Corporation, Koto-ku (JP)

(72) Inventor: Toshiyuki Naito, Tokyo (JP)

(73) Assignee: IHI Corporation, Koto-ku (JP)

( * ) Notice: Subject to any disclaimer, the term of this patent is extended or adjusted under 35 U.S.C. 154(b) by 123 days.

(21) Appl. No.: 15/960,745

(22) Filed: Apr. 24, 2018

(65) Prior Publication Data

US 2018/0236395 A1 Aug. 23, 2018

Related U.S. Application Data

(63) Continuation of application No. PCT/JP2017/000945, filed on Jan. 13, 2017.

(30) Foreign Application Priority Data

Mar. 16, 2016 (JP) .................................. 2016-051910

(51) Int. Cl.
*B01D 53/047* (2006.01)
*B01D 53/26* (2006.01)
(Continued)

(52) U.S. Cl.
CPC .......... *B01D 53/047* (2013.01); *B01D 53/26* (2013.01); *B01D 53/261* (2013.01);
(Continued)

(58) Field of Classification Search
CPC .... B01D 53/047; B01D 53/26; B01D 53/261; B01D 53/265; B01D 53/56; B01D 53/62;
(Continued)

(56) References Cited

U.S. PATENT DOCUMENTS 3,221,477 A * 12/1965 Arnoldi .................. B64D 13/04
 95/26
4,784,672 A * 11/1988 Sircar ................ B01D 53/0462
 95/123
(Continued)

FOREIGN PATENT DOCUMENTS

JP 2001-221429 8/2001
JP 2010-184229 8/2010
(Continued)

OTHER PUBLICATIONS

International Search Report dated Apr. 11, 2017 in PCT/JP2017/000945 filed Jan. 13, 2017 (with English Translation).
(Continued)

*Primary Examiner* — Frank M Lawrence, Jr.
(74) *Attorney, Agent, or Firm* — Oblon, McClelland, Maier & Neustadt, L.L.P.

(57) ABSTRACT

A carbon dioxide recovery apparatus has: a separator that separates carbon dioxide from a gas and discharges a residual gas from which carbon dioxide has been removed; a dryer having a hygroscopic agent for drying the gas to be supplied to the separator; and a regeneration system which supplies the residual gas to the dryer as a regeneration gas for regenerating the hygroscopic agent in the dryer. The separator utilizes adsorption/desorption of carbon dioxide to an adsorbent caused by pressure fluctuation. A supplement system supplies a supplement gas from an outside to the residual gas depending on a flow rate of the residual gas discharged from the separator such that a flow rate of the regeneration gas is a predetermined rate.

9 Claims, 1 Drawing Sheet

(51) Int. Cl.
| | |
|---|---|
| *C01B 32/50* | (2017.01) |
| *B01J 20/16* | (2006.01) |
| *B01J 20/22* | (2006.01) |
| *B01J 20/34* | (2006.01) |
| *B01J 20/18* | (2006.01) |
| *B01J 20/20* | (2006.01) |
| *B01J 20/10* | (2006.01) |
| *B01D 53/56* | (2006.01) |
| *B01D 53/62* | (2006.01) |
| *B01D 53/78* | (2006.01) |
| *B01D 53/82* | (2006.01) |
| *B01D 53/96* | (2006.01) |

(52) U.S. Cl.
CPC ........... *B01D 53/265* (2013.01); *B01D 53/56* (2013.01); *B01D 53/62* (2013.01); *B01D 53/78* (2013.01); *B01D 53/82* (2013.01); *B01D 53/96* (2013.01); *B01J 20/103* (2013.01); *B01J 20/165* (2013.01); *B01J 20/18* (2013.01); *B01J 20/20* (2013.01); *B01J 20/226* (2013.01); *B01J 20/3408* (2013.01); *B01J 20/3416* (2013.01); *B01J 20/3433* (2013.01); *B01J 20/3483* (2013.01); *C01B 32/50* (2017.08); *B01D 2253/106* (2013.01); *B01D 2253/108* (2013.01); *B01D 2253/204* (2013.01); *B01D 2257/404* (2013.01); *B01D 2257/504* (2013.01); *B01D 2257/80* (2013.01); *B01D 2258/0283* (2013.01); *B01D 2259/402* (2013.01); *B01D 2259/4005* (2013.01); *B01J 20/223* (2013.01); *Y02C 10/04* (2013.01); *Y02C 10/08* (2013.01)

(58) Field of Classification Search
CPC ........ B01D 53/78; B01D 53/82; B01D 53/96; B01D 2253/106; B01D 2253/108; B01D 2253/204; B01D 2257/404; B01D 2257/504; B01D 2257/80; B01D 2258/0283; B01D 2259/4005; B01D 2259/402; B01J 20/103; B01J 20/165; B01J 20/18; B01J 20/20; B01J 20/223; B01J 20/226; B01J 20/3408; B01J 20/3416; B01J 20/3422; B01J 20/2383; B01B 32/50; Y01C 10/04; Y01C 10/08
USPC .................. 95/23, 96, 98, 99, 115, 117, 139; 96/110, 121, 126, 128, 130, 132, 134, 96/144

See application file for complete search history.

(56) References Cited

U.S. PATENT DOCUMENTS

| | | | | |
|---|---|---|---|---|
| 5,846,295 | A * | 12/1998 | Kalbassi | B01D 53/0407 95/105 |
| 7,575,624 | B2 * | 8/2009 | Cartwright | B01D 53/04 95/139 |
| 2010/0024476 | A1 | 2/2010 | Shah | |
| 2010/0206165 | A1 | 8/2010 | Alban et al. | |
| 2010/0251887 | A1 * | 10/2010 | Jain | B01D 53/0462 95/46 |
| 2018/0243680 | A1 * | 8/2018 | Naito | B01D 53/261 |
| 2019/0178574 | A1 * | 6/2019 | Naito | F25J 3/0266 |

FOREIGN PATENT DOCUMENTS

| | | |
|---|---|---|
| JP | 2011-067792 | 4/2011 |
| JP | 2011-529848 | 12/2011 |
| JP | 2012-110824 | 6/2012 |
| JP | 5350376 | 11/2013 |
| JP | 2016-040025 | 3/2016 |

OTHER PUBLICATIONS

Written Opinion dated Apr. 11, 2017 in PCT/JP2017/000945 filed Jan. 13, 2017.

\* cited by examiner

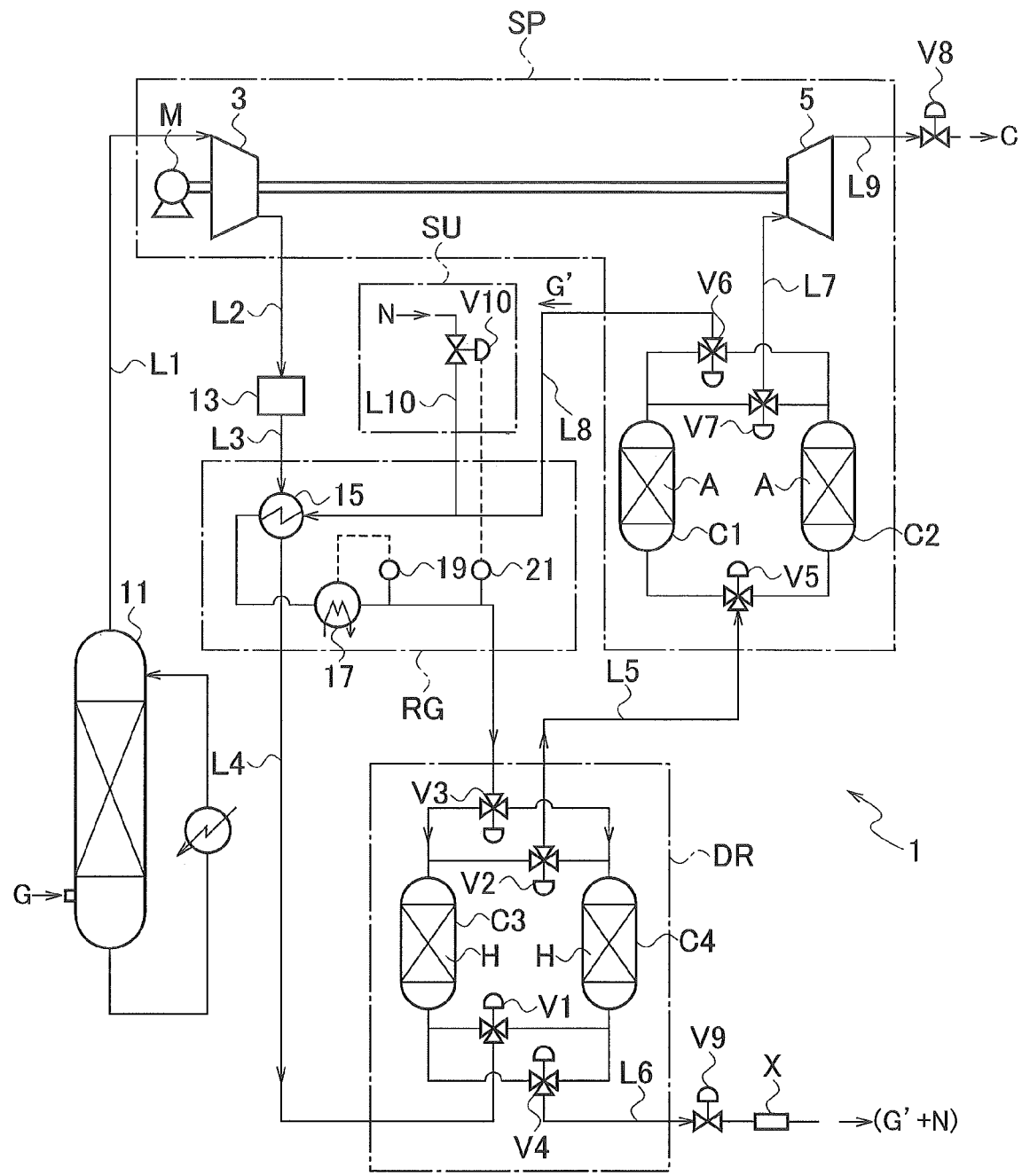

CARBON DIOXIDE RECOVERY METHOD AND RECOVERY DEVICE

CROSS REFERENCE TO RELATED APPLICATIONS

This application is a continuation application of International Application No. PCT/JP2017/000945, filed on Jan. 13, 2017, which claims priority of Japanese Patent Application No. 2016-051910, filed on Mar. 16, 2016, the entire contents of which are incorporated by reference herein.

BACKGROUND

Technical Field

The present disclosure relates to carbon dioxide recovery apparatus and recovery method which recover carbon dioxide from a carbon dioxide containing gas such as a combustion gas, according to a pressure swing adsorption method.

Description of the Related Art

In facilities such as thermal power plants, steelworks, and boilers, a large amount of fuel such as coal, fuel oil, and ultra-heavy oil is used. The release amount and concentration of sulfur oxides, nitrogen oxides, and carbon dioxide emitted by combustion of the fuel need to be restricted from the view point of air pollution prevention and global environment protection. In recent years, carbon dioxide has been considered as a main cause of global warming, and movements to suppress discharge thereof have become more active globally. Various studies have been vigorously made to recover and store carbon dioxide in a combustion exhaust gas and a process exhaust gas, instead of releasing it into the atmosphere. As examples of carbon dioxide recovery methods, there are known a pressure swing adsorption method, a membrane separation concentration method, and a chemical absorption method utilizing reactive absorption of a basic compound.

The pressure swing adsorption (PSA) method is a separation method in which an adsorbent having selective adsorptivity for a specific component is used to adsorb the specific component in a gas and thereby separate the specific component from the gas. The PSA method is widely known as a separation method for a mixed gas containing multiple components and can be utilized as the separation method for a mixed gas in various fields. In the PSA method, the specific component adsorbed on the adsorbent is recovered by reducing the pressure after the adsorption so as to desorb the specific component from the adsorbent, and the adsorption and the desorption are repeatedly performed. The separation efficiency of the PSA method depends on the selectivity of the adsorbent for the specific component, and the PSA method can be utilized for removing, separating, concentrating, or refining the specific component, depending on the selectivity of the adsorbent, the concentration of the specific component in a raw-material gas, and the like. Japanese Patent Application Laid-Open No, 2001-221429 (Publication Document 1 in the Documents List below) has description about oxygen produced by a PSA device which is supplied to oxygen combustion equipment.

Conventionally, as a prevailing method for recovering carbon dioxide from an exhaust gas, there has been a method including removing various impurities (sulfur oxides, nitrogen oxides, chlorine, mercury, and the like) from the exhaust gas and then refining the remaining concentrated carbon dioxide by cryogenic separation (liquefaction and superfractionation), and various studies are being made to put this method to practical use.

Separation of carbon dioxide utilizing an adsorbent is described in Japanese Patent Application Laid-Open No. 2010-184229 (Publication Document 2). This literature has description about a technique in which a carrier made of mesoporous silica and carrying an element selected from Mg, Ca, Sr, Ba, Y, and La is used as the adsorbent and carbon dioxide adsorbed to the adsorbent is disrobed by heating. Meanwhile, Japanese Patent No. 5350376 (Publication Document 3) has description about that, in refining of a carbon dioxide containing gas, silica gel, zeolite, porous glass, or the like is used as an adsorbent in absorption and removal of water in the presence of sulfur oxides and nitrogen oxides.

DOCUMENTS LIST

Publication Document 1: Japanese Patent Application Laid-Open No. 2001-221429
Publication Document 2: Japanese Patent Application Laid-Open No, 2010-184229
Publication Document 3: Japanese Patent No. 5350376

BRIEF SUMMARY

In the PSA method, it is relatively easy to selectively separate carbon dioxide from an exhaust gas containing various types of impurities in addition to carbon dioxide and recover high-purity carbon dioxide. In this respect, the recovery of carbon dioxide by the PSA method is superior to the recovery method including removing the various impurities (sulfur oxides, nitrogen oxides, chlorine, mercury, and the like) from the exhaust gas and then obtaining carbon dioxide by performing cryogenic separation (liquefaction and superfractionation). Moreover, the PSA method is advantageous in that burden of maintenance dealing with corrosion in tools and devices for removing the aforementioned impurities is reduced.

An exhaust gas that has been subjected to dehumidification processing is supplied to a separator using the PSA method, in order to prevent inhibition of selective adsorption ability. Accordingly, a residual gas obtained after the separation of carbon dioxide contains substantially no moisture. A hygroscopic agent used in the dehumidification processing can be regenerated and used repeatedly by being heated or by being supplied with a dry gas. Thus the hygroscopic agent can be regenerated by utilizing the residual gas obtained after the carbon dioxide separation. However, in an actual condition of exhaust gas processing, the amount of the residual gas obtained after the carbon dioxide separation fluctuates and this fluctuation unexpectedly affects the regeneration of the hygroscopic agent. Moreover, when the exhaust gas with a high carbon dioxide concentration is processed, the amount of the residual gas is insufficient for the regeneration of the hygroscopic agent. In order for the separation and recovery of carbon dioxide to stably proceed, it is important that the repetitive regeneration of the hygroscopic agent is stably carried out.

An object of the present disclosure is to solve the aforementioned problems and provide carbon dioxide recovery method and recovery apparatus which can stably and economically perform processing by preventing fluctuation in processing capability in the case where carbon dioxide is recovered from a carbon dioxide containing gas by utilizing a pressure swing adsorption method.

As a result of earnest research made on an actual condition of exhaust gas processing to solve to the aforementioned problems, the inventors have reached a manner of addressing a point that the amount of a residual gas obtained after the carbon dioxide separation fluctuates depending on the amount of carbon dioxide contained in the exhaust gas, and have completed the technique of the present disclosure.

According to one aspect of the present disclosure, a carbon dioxide recovery apparatus has: a separator which separates carbon dioxide from a gas by utilizing adsorption and desorption of carbon dioxide to and from an adsorbent caused by pressure fluctuation and discharges a residual gas from which carbon dioxide has been removed; a dryer which has a hygroscopic agent for drying the gas to be supplied to the separator; a regeneration system which supplies the residual gas discharged from the separator to the dryer as a regeneration gas to be used for regeneration of the hygroscopic agent in the dryer; and a supplement system which supplies a supplement gas from an outside to the residual gas depending on a flow rate of the residual gas discharged from the separator such that a flow rate of the regeneration gas is a predetermined rate.

The supplement system can be configured to include: a line which supplies a nitrogen gas discharged from an air separation unit as the supplement gas; a flowmeter which measures the flow rate of the regeneration gas supplied to the dryer; and a flow regulating valve which is electrically connected to the flowmeter and which adjusts supply of the supplement gas.

In a configuration in which the separator includes a pressurizer which pressurizes the gas supplied to the separator to a pressure at which the adsorbent is capable of adsorbing carbon dioxide and the supplement system further includes a heat exchanger which exchanges heat between the gas pressurized by the pressurizer and the regeneration gas to be supplied to the dryer, the residual gas can be heated by the heat exchange in the heat exchanger and the pressurized gas can be cooled by the heat exchange in the heat exchanger and supplied to the dryer and the separator. The regeneration gas subjected to the heat exchange by the heat exchanger may be the residual gas to which the supplement gas has been supplied.

In a configuration in which the separator includes paired columns which contain the adsorbent and an expander serving as a pressure reducer which reduces a pressure in each of the columns to a pressure at which desorption of carbon dioxide adsorbed on the adsorbent is possible and the pressurizer includes a compressor which compresses the gas, the expander and the compressor can be configured to cooperate with each other.

It is preferable from the point of maintaining the performance of the separator that the recovery apparatus further includes a denitrator which removes a nitrogen oxide from the gas to be supplied to the separator. The denitrator can be configured to include a gas-liquid separator which separates condensate water condensed from the gas, thereby removing the nitrogen oxide contained in the condensate water.

Moreover, according an aspect of the present disclosure, a carbon dioxide recovery method includes: separation processing of separating carbon dioxide from a gas by utilizing adsorption and desorption of carbon dioxide to and from an adsorbent caused by pressure fluctuation and of discharging a residual gas from which carbon dioxide has been removed; drying treatment of drying the gas to be supplied to the separation processing by using a hygroscopic agent; regeneration processing of supplying the residual gas discharged in the separation processing to the hygroscopic agent used in the drying treatment, as a regeneration gas to be used for regeneration of the hygroscopic agent; and supplement processing of supplying a supplement gas from an outside depending on a flow rate of the residual gas discharged from the separator such that a flow rate of the regeneration gas is a predetermined rate.

By using a metal-organic framework as the adsorbent, it is possible to eliminate a negative pressure condition and form the separator employing the PSA method without using a vacuum pump. The residual gas obtained after the processing by the PSA method can be effectively utilized as the regeneration gas in the dryer, and the utilization efficiency of energy is improved.

According to the present disclosure, carbon dioxide recovery method and recovery apparatus which can stably and economically perform processing can be provided, by preventing fluctuation in processing capability in the carbon dioxide recovery from a carbon dioxide containing gas by utilizing a pressure swing adsorption method. Implementation is easy because general equipment is utilized without using special or expensive equipment. Accordingly, the present disclosure is economically advantageous and improves the versatility of the carbon dioxide recovery method using the PSA method, which is effective for expanding the field of application.

BRIEF DESCRIPTION OF DRAWINGS

FIG. 1 is a schematic configuration diagram illustrating a carbon dioxide recovery apparatus according to one embodiment of the present disclosure.

DETAILED DESCRIPTION OF EMBODIMENTS

The pressure swing adsorption (PSA) method is a method for separating and removing a specific component in a mixed gas by utilizing adsorption and desorption of the specific component to and from an adsorbent caused by pressure fluctuation, and it can be utilized to recover carbon dioxide from a carbon dioxide containing gas such as a combustion exhaust gas, by using a material capable of adsorbing carbon dioxide as the adsorbent. Increasing the pressure of an exhaust gas supplied to the adsorbent to a relatively high pressure (adsorption pressure) causes the adsorbent to adsorb carbon dioxide, and reducing the pressure to a relatively low pressure (desorption pressure) causes the adsorbent to desorb and release the adsorbed carbon dioxide. A carbon dioxide-removed gas and concentrated (or refined) carbon dioxide are obtained from the exhaust gas by repeating such increase and decrease of the pressure to cause the adsorbent to adsorb and desorb (release an adsorbate) carbon dioxide in the exhaust gas.

In order to prevent inhibition of selective adsorption ability in a separator using the PSA method, the exhaust gas subjected to drying treatment is supplied to the separator. A hygroscopic agent is used in the drying treatment. The used hygroscopic agent can be regenerated and used repeatedly by supplying heat or dry gas. A residual gas obtained after the separation of carbon dioxide in the separator contains substantially no moisture and can be thus utilized to regenerate the hygroscopic agent. However, the amount of the residual gas obtained after the carbon dioxide separation depends on the amount of carbon dioxide contained in the exhaust gas and fluctuates depending on changes in the amount of carbon dioxide contained in the exhaust gas. In an actual processing condition, when the amount of the residual gas supplied to the hygroscopic agent as a regeneration gas fluctuates, this fluctuation unexpectedly affects the regeneration of the hygroscopic agent. In order to stably repeat the regeneration of the hygroscopic agent, it is effective to achieve a configuration which can supply the regeneration gas to the hygroscopic agent at a constant amount irrespective of the fluctuation in the amount of carbon dioxide contained in the exhaust gas and the fluctuation in the amount of residual gas.

In the present disclosure, the residual gas obtained after the separation of carbon dioxide, in the recovery of carbon dioxide utilizing the separation using the PSA method, is supplied as the regeneration gas to be used for regeneration of the hygroscopic agent for drying. And, in this case, a supplement gas is supplied from the outside as necessity arises such that the supply flow rate of the regeneration gas is constant. Thus a carbon dioxide recovery method and recovery apparatus configured as described above are proposed. The carbon dioxide recovery method according to an embodiment of the disclosure and the carbon dioxide recovery apparatus for executing this method are described below with reference to the drawing.

FIG. 1 is a schematic configuration diagram illustrating an embodiment of the carbon dioxide recovery apparatus in the present disclosure. The recovery apparatus 1 has: a separator SP which separates carbon dioxide from a gas by using the PSA method; a dryer DR which dries the gas to be supplied to the separator SP; a regeneration system RG which supplies a residual gas from which carbon dioxide has been removed to the dryer DR as a regeneration gas to be used for regeneration of a hygroscopic agent H in the dryer DR; and a supplement system SU which supplies a supplement gas from the outside to the residual gas as necessary such that the flow rate of the residual gas is a predetermined rate.

The separator SP has at least one pair of columns C1, C2 containing the adsorbent A. The separator SP is also provided with a compressor 3 which serves as a pressurizer for applying to a gas G a pressure at which carbon dioxide is adsorbed to the adsorbent A and an expander 5 which serves as a pressure reducer for reducing the pressure in the columns C1, C2 to a pressure at which carbon dioxide can be desorbed from the adsorbent A. Operations of the compressor 3 and the expander 5 can cause pressure fluctuation in the columns C1, C2, and the adsorption and desorption of the carbon dioxide to and from the adsorbent A caused by the pressure fluctuation can be utilized to separate carbon dioxide from the gas G. As a result, highly-concentrated carbon dioxide C and a residual gas G' from which carbon dioxide has been removed are discharged from the separator SP, The adsorptive separation of carbon dioxide can be performed by using a single column. However, in such a case, the gas G is intermittently supplied according to switching between the adsorption and the desorption, and the processing is intermittent.

The dryer DR includes the hygroscopic agent H for drying the gas G to be supplied to the separator SP. The hygroscopic agent H is contained in at least one pair of columns C3, C4. The gas G pressurized by the compressor 3 is dehumidified by the hygroscopic agent H in the dryer DR and then supplied to the separator SP. The hygroscopic agent H absorbing moisture can be regenerated by being heated or being supplied with a dry gas.

Since the gas G supplied to the separator SP is dry, the residual gas G' obtained after the removal of carbon dioxide in the separator SP contains substantially no moisture. Accordingly, the residual gas G' can be used as the regeneration gas to be used for regeneration of the hygroscopic agent H in the dryer DR, and the regeneration system RG supplies the residual gas G' discharged from the separator SP to the dryer DR as the regeneration gas to be used for regeneration of the hygroscopic agent H in the dryer DR. A device for heating the residual gas G' is provided to improve the regeneration efficiency, and the recovery apparatus 1 is designed to have a configuration with improved heat efficiency.

The residual gas G' discharged from the separator SP is decreased to be less than the gas G by an amount corresponding to the removed carbon dioxide. In other words, the discharge amount of the residual gas G' fluctuates depending on the amount of carbon dioxide contained in the gas G supplied to the recovery apparatus 1. When the amount of carbon dioxide contained in the gas G is large, the flow rate of the residual gas G' decreases greatly and shortage of the regeneration gas occurs. Particularly, when the amount of carbon dioxide contained in the gas G is 50% or the vicinity, the shortage of the regeneration gas becomes unignorable. Accordingly, in order to prevent the shortage of the regeneration gas due to the fluctuation in the amount of carbon dioxide contained in the gas G, there is provided the supplement system SU which constantly maintains the amount of regeneration gas at the predetermined amount by adding a supplement gas N to the residual gas G' from the outside as necessity arises. As the supplement gas N supplied from the outside, there is used a gas which has a moisture content usable for the regeneration of the hygroscopic agent H and which does not substantially affect the performance of the hygroscopic agent. A gas consisting of an inert component such as nitrogen is thus preferably used as the supplement gas N. The supplement gas N does not have to be a gas consisting of a single component and may have a mixed composition of multiple components as long as the gas is usable for the regeneration of the hygroscopic agent H. For example, since a nitrogen gas discharged from an oxygen production equipment (ASU: air separation unit) has a water content of about 1 to 2 ppm, this nitrogen gas can be used as it is and is useful as the supplement gas N. Moreover, air or the like discharged from the air-conditioned facilities, etc. is also dry and can be utilized as the supplement gas N. The supplement system SU supplies the supplement gas N from the outside to the residual gas G' depending on the flow rate of the residual gas G' discharged from the separator SP, and the flow rate of the regeneration gas supplied to the dryer DR is thus maintained at a constant rate. Hence, the regeneration gas is constantly and stably supplied to the dryer DR, and the separator SP is avoided from being affected by regeneration failure of the hygroscopic agent H.

A specific configuration of the recovery apparatus 1 in FIG. 1 is described below. It is noted that broken lines in FIG. 1 illustrate electrical connections. The recovery apparatus 1 includes a cooler 11. The gas G containing carbon dioxide is first supplied to the cooler 11. The cooler 11 is equipment for cooling the gas G discharged from the combustion facility or the like at a high temperature to a temperature suitable for processing in the subsequent equipment and is configured to cool the gas G to a temperature of about 50° C. or less, preferably about 40° C. or less at the outlet. The temperature of the combustion exhaust gas at the inlet is generally about 100 to 200° C. Since the volume of the gas decreases by cooling, this makes it possible to increase the processing amount in subsequent equipment. A coolant may be any generally-used coolant such as water, air, or a coolant for refrigeration cycle. Regarding the contact with the coolant, any type of cooling may be employed, such as those of a direct-contact type such spraying, gas-liquid contact using a packing, etc., those of indirect-contact type using a condenser, a heat exchanger, or the like. In this embodiment, a scrubber which cools the gas G by bringing the gas G into direct contact with cooling water is provided as the cooler 11, The direct-contact cooling using cooling water is excellent in economy and cooling efficiency and also has a function of cleaning means for removing fine solid matters such as dust and acid substances such as chlorides and sulfur oxides, from the gas G.

The cooler 11 is connected to the compressor 3 via a flow passage L1. The gas G whose temperature is adjusted to a suitable temperature by the cooler 11 is supplied to the compressor 3 to be compressed, and the pressure thereof is increased. The compressor 3 is operated by a power source M such as, for example, a motor, and applies to the gas G a pressure required for the adsorption of the carbon dioxide in the subsequent separator SP. Specifically, the compressor 3 pressurizes the gas G to a pressure such that the partial pressure of the carbon dioxide in the gas G supplied to the separator SP reaches the adsorption pressure (relatively high pressure). The pressure to be applied by the compressor 3 is thus determined based on the carbon dioxide concentration in the gas G and the adsorption pressure. The adsorption pressure is appropriately set based on an adsorption isotherm of carbon dioxide on the adsorbent A used in the separator SP. The pressurization pressure of the gas G is thus set, depending on the carbon dioxide concentration in the gas G, to a pressure at which the carbon dioxide partial pressure in the gas G reaches the adsorption pressure. Hence, the pressure of the pressurized gas G is expressed by the following formula: pressure=100×adsorption pressure/carbon dioxide concentration in gas G [%]. The adsorption pressure employed in the separator SP is preferably a pressure equal to or higher than a threshold indicated by the adsorption isotherm on the adsorbent and varies depending on the used adsorbent. However, the adsorption pressure can be generally set to about 0.3 to 0.6 MPa. Any pressurizing devices capable of generating flow pressure that can pressurize the gas G such that the partial pressure of carbon dioxide reaches an appropriate adsorption pressure can be used as the pressurizer, and a pressure pump, a compressor, a blower, and the like can be given as examples of such devices. Accordingly, the compressor 3 can be replaced with other pressurizing device which can pressurize the gas G such that the partial pressure of carbon dioxide in the gas G reaches the adsorption pressure. However, since a pressurizing device that the applied pressure is relatively small can be used in the PSA method as compared with the conventional method, the compressor and the blower can be preferably utilized and the compressor is most preferable. The pressure applied to the gas G by the compressor 3 can be maintained in the separator SP by providing a pressure regulating valve downstream of the separator SP. The pressure of the gas G can be adjusted by controlling the pressure regulating valve. In the embodiment, the pressurization pressure can be adjusted by using a pressure regulating valve V9 (see below) provided on the regeneration gas discharge side of the dryer DR. The pressurization in the compressor 3 increases the temperature of the gas G. For example, when the gas G whose temperature is 40° C. and whose carbon dioxide concentration is 80% (volume percent) is pressurized to about 0.5 MPa, the partial pressure of carbon dioxide is about 0.4 MPa which is suitable as the adsorption pressure, and the temperature of the gas G in this case is about 190° C. When the pressurization pressure of the gas G in the compressor 3 is appropriately adjusted depending on the concentration of carbon dioxide as described above, the temperature of the gas G after the pressure increase is generally increased to about 180 to 200° C.

When nitrogen oxides are contained in the gas G, the nitrogen oxides are preferably removed as much as possible in consideration of effects on selective adsorption ability of the adsorbent A in the separator SP. For this purpose, a denitrator 13 is provided and the compressor 3 is connected to the denitrator 13 via a flow passage L2. The denitrator 13 may utilize any method appropriately selected from denitration methods generally used for denitration of exhaust gas such as dry denitration using a solid absorbent, adsorbent, or catalyst or wet denitration using an aqueous liquid containing a basic substance. For example, a catalyst which decomposes a nitrogen oxide into nitrogen by reacting the nitrogen oxide with ammonia is preferably used. Moreover, nitrogen monoxide included in the nitrogen oxides is very low in water solubility and is difficult to dissolve and remove with water alone. However, in the embodiment of FIG. 1, since the gas G is pressurized by the compressor 3, removal by dissolution into water can be performed by utilizing reaction progress caused by the pressurization. Specifically, oxidation of nitrogen monoxide progresses in the pressurized gas G and nitrogen monoxide is converted to nitrogen dioxide with high water solubility. In addition, water vapor in the gas G is condensed by the pressurization and the nitrogen oxides contained in the gas G dissolve into the condensate water as nitrogen dioxide. Accordingly, denitration processing of the gas G can be performed by separating and removing the condensate water from the pressurized gas G with use of a gas-liquid separator or the like. In this processing method, a basic substance is unnecessary and the water content of the gas G is reduced. Accordingly, the burden on the dryer DR in the subsequent stage is reduced.

The denitrator 13 is connected to a heat exchanger 15 via a flow passage L3 and the denitrated gas G is cooled in the heat exchanger 15 by the residual gas G' discharged from the separator SP. The residual gas G' is thereby heated to a temperature suitable for utilization as the regeneration gas (details are described later). It is noted that, in the case where the heat exchanger 15 is corrosion resistant or the gas G contains a relatively small amount of nitrogen oxides, the aforementioned denitrator 13 can be arranged in the stage subsequent to the heat exchanger 15. In that a case, the amount of condensate water separated and removed by cooling of the pressurized gas G increases. Accordingly, the water content of the gas G is reduced and the burden on the drying treatment in the dryer DR in the subsequent stage is reduced.

The heat exchanger 15 is connected to the dryer DR via a flow passage L4, and the cooled gas G is subjected to the drying treatment by the dryer DR. The dryer DR is equipment for removing moisture from the gas G to prevent damage and functional decline of the adsorbent A used in the separator SP, and is particularly important in the case where the cooler 11 and the denitrator 13 in the previous stages are configured by using a wet type device. The dryer DR has the columns C3, C4 containing the hygroscopic agent H therein. The gas G is dehumidified by being brought into contact with the hygroscopic agent H, and the gas G with low humidity is supplied to the separator SP via a flow passage L5. The hygroscopic agent H may be appropriately selected and used from commonly used desiccant materials such as silica gel, alumina gel, molecular sieve, zeolite, activated carbon and the like. A hygroscopic agent which can be easily regenerated by heating such as silica gel and the like is economically advantageous and can form a temperature swing moisture absorbing tower. Forming the dryer DR by using one pair or more of moisture absorbing columns loaded with the hygroscopic agent H enables alternate performance of moisture absorption of the gas G and the regeneration of the hygroscopic agent H in each moisture absorbing column by supplying the gas G and the high-temperature regeneration gas alternately to the moisture absorbing column. In other words, the drying treatment and the regeneration of the hygroscopic agent H can be repeatedly and continuously performed without stopping the processing of the gas G. This is achieved by performing switching control of switching valves V1, V2, V3, V4. Controlling the switching valves V1, V2 such that the flow passages L4, L5 communicate with one of the columns C3, C4 causes the gas G supplied from the flow passage L4 to be dehumidified in the one of the columns C3, C4 and supplied to the separator SP via the flow passage L5. At this time, the connection of the switching valves V3, V4 is controlled such that the regeneration gas supplied to the dryer DR flows through the other column and is discharged from a flow passage L6. By reversing the connection of the switching valves V1, V2, V3, V4, the moisture absorption and the regeneration in the columns C3, C4 are switched. The switching valves V1, V2, V3, V4 may be configured to be automatically switched depending on the moisture concentration of the gas G discharged from the flow passage L5. For example, such a configuration can be given that a concentration sensor is provided in the flow passage L5 to be electrically connected to the switching valves V1, V2, V3, V4 and that respective switching of the switching valves V1, V2, V3, V4 is performed based on an increase in the moisture concentration detected by the concentration sensor so as to change the column communicating with the flow passage L4 and the flow passage 15.

A main portion of the separator SP is configured by the columns C1, C2 containing the adsorbent A for separating carbon dioxide from the gas according to the PSA method. Supplying the gas G causes carbon dioxide contained in the gas G to be adsorbed to the adsorbent A and the residual gas G' with less carbon dioxide is discharged. Specifically, the gas G supplied from the dryer DR to the separator SP via the flow passage L5 is separated in the columns C1, C2 into concentrated or refined carbon dioxide C and the residual gas G' which is a de-carbon dioxide gas that carbon dioxide has been reduced or removed. The separator SP is connected to the expander 5 and a liquefying device (not illustrated) via a flow passage L7 and is also connected to the dryer DR via flow passage L8. The residual gas G' from which carbon dioxide has been removed by the adsorbent A flows out from the column to be released from the separator SP and is supplied to the dryer DR via the flow passage L8 connected to the dryer DR. Meanwhile, when the column is made to communicate with the flow passage L7 by connection switching of the switching valves, a pressure decrease by the expander 5 causes the carbon dioxide adsorbed on the adsorbent A to be desorbed, and the concentrated or refined carbon dioxide C is supplied to the liquefying device via the flow passages L7, L9. The expander 5 is connected to cooperate with the compressor 3, and the flow pressure generated at the pressure release in the expander 5 is recovered as power and is utilized as a part of the drive power for the compressor 3. Therefore, energy consumed in the power source M of the compressor 3 can be reduced. For the connection between the expander 5 and the compressor 3, a known method such as shaft connection or integral connection can be appropriately utilized. For example, such a form that a scroll compressor and a scroll expander, which are scroll type fluid machines, are used in a coaxial state can be employed.

The adsorbent A contained in the columns C1, C2 is an adsorbent capable of selectively adsorbing carbon dioxide in the PSA method. The desorption pressure for activated carbon and zeolite which are conventionally known as materials capable of adsorbing carbon dioxide is a negative pressure. Thus, a vacuum pump is necessary for desorption of carbon dioxide. Meanwhile, in metal-organic frameworks which are recently studied as an adsorbent, the adsorption isotherm indicating the relationship between the pressure of adsorbate and adsorption equilibrium is curved in an S shape and has an abrupt rising portion around a certain pressure. Accordingly, even when the pressure difference between the adsorption pressure and the desorption pressure is small, the difference in the equilibrium adsorption amount (=adsorption capacity) can be made large. In the embodiment of FIG. 1, metal-organic frameworks (MOFs) capable of selectively adsorbing carbon dioxide are usable as the adsorbent A. The metal-organic frameworks are porous materials also called porous coordination polymers (PCPs). In the metal-organic frameworks, a complex formed by coordinate bonding of metal ion and organic ligand forms a base of a framework of a porous structure, and the metal-organic frameworks function as the adsorbent by utilizing this porous structure. Examples of the metal-organic frameworks include $[Cu(4,4'\text{-dihydroxybiphenyl-3-carboxy})_2(4,4'\text{-bipyridyl})]_n$, $[Cu(PF_6^-)_2(1,2\text{-bis(4-pyridyl)ethane})]_n$, $[Cu(CF_3SO_3^-)_2(1,3\text{-bis(4-pyridyl)propane})_2]_n$, $\{[Cu(PF_6^-)(2,2\text{-bis(4-pyridyl)})]PF_6^-\}_n$, $[Cu_2(PF_6^-)_2(4,4'\text{-pyridyl)propane})_2]_n$, $[Cu_2(PF_6^-)_2(\text{pyridine})_4]_n$, $[M_2(2,5\text{-dioxide-1,4-benzenedicarboxylate})]$ (wherein M in the formula is $Mg^{2+}$, $Mn^{2+}$, $Co^{2+}$, $Ni^{2+}$, $Fe^{2+}$, or $Zn^{2+}$), $[Cu(4,4'\text{-dioxidebiphenyl-3-carboxylate})_2(4,4'\text{-bipyridyl})]_n$, $[Zn_4O(4,4',4''\text{-(benzene-1,3,5-triyl-tris(benzene-4,1-diyl)tri benzoate})]_n$, and the like. Alternatively, metal-organic framework with adsorptivity for carbon dioxide appropriately may be selected and utilized from commercially-available metal-organic frameworks. Multistage adsorption processing can be executed by using multiple pairs of columns. In such a case, different types of metal-organic frameworks may be used in the respective pairs to provide adsorption performances corresponding to the respective types. Some metal-organic frameworks exhibit adsorptivity for plural kinds of gases. In such metal-organic frameworks, the pressure at the threshold in the adsorption isotherm generally varies among the types of gases, and selective adsorption for carbon dioxide can be suitably carried out by appropriate pressure setting.

In each of the columns C1, C2, carbon dioxide contained in the gas G is adsorbed to the adsorbent A when the gas G is supplied at the pressure at which the partial pressure of the carbon dioxide is equal to the adsorption pressure (relatively high pressure). Meanwhile, when the pressure drops to the desorption pressure (relatively low pressure), carbon dioxide is desorbed from the adsorbent A and is released. For example, when $[Cu(4,4'\text{-dihydroxybiphenyl-3-carboxy})_2(4,4'\text{-bipyridyl})]_n$ is used as the metal-organic framework, the adsorption equilibrium changes abruptly around 0.25 MPa. Accordingly, it is possible to set the adsorption pressure within a higher pressure range (>0.25 MPa) and set the desorption pressure within a lower pressure range (<0.25 MPa), where the border is set at the pressure value (threshold) at which the equilibrium adsorption amount changes abruptly. Such setting can make the difference between the equilibriums adsorption amounts (=adsorption capacity) large even when the pressure difference between the adsorption pressure and the desorption pressure is small. Accordingly, load on the device due to the pressure swing between the adsorption pressure and the desorption pressure is greatly reduced from that in the conventional technique, and burden of increasing the durability of the device structure can be reduced. Moreover, since the desorption pressure can be set to the atmospheric pressure or a positive pressure (pressure higher than the atmospheric pressure) instead of a negative pressure, the adsorption pressure and the desorption pressure can be set and adjusted by using the pressure regulating valves, without using a vacuum pump. Thus, energy which will be otherwise consumed by the vacuum pump can be saved, and it is possible to eliminate a limit on processing capacity of the recovery apparatus imposed by the performance of the vacuum pump that is a problem in the conventional PSA method.

The series of operations of supplying the gas G and reducing the pressure are repeated so that the adsorption and desorption of carbon dioxide are alternately performed in the two columns C1, C2, thereby the separation of carbon dioxide from the gas G and the recovery of carbon dioxide are alternately and repeatedly performed in each column. This is achieved by performing switching control of switching valves V5, V6, V7. Controlling the switching valves V5, V6 such that the flow passage L5 and the flow passage L8 communicate with one of the columns C1, C2 causes carbon dioxide in the gas G supplied from the flow passage L5 to be adsorbed and removed in the one of the columns C1, C2 and causes the residual gas G' to be discharged from the flow passage L8. At this time, the connection of the switching valve V7 is controlled such that the other column communicates with the flow passage L7 and the expander 5. The pressure in the other column is thereby reduced to the desorption pressure and carbon dioxide is released from the adsorbent A. Thereafter, the connection of the switching valves V5, V6, V7 is reversed to switch the adsorption and the desorption in the columns C1, C2. Carbon dioxide C is thus recovered alternately from the paired columns in the separator SP via the flow passage L9 by using the gas G continuously supplied from the compressor 3 via the dryer DR. The recovered carbon dioxide C is eventually liquefied. The desorption pressure in the columns C1, C2 can be adjusted by using a pressure regulating valve V8 in the flow passage L9. The residual gas G' from which carbon dioxide has been removed is returned to the dryer DR via the flow passage L8. The carbon dioxide concentration in the residual gas G' can be detected by installing a carbon dioxide concentration sensor in the flow passage L8, that is downstream of the switching valve V6. An increase in the carbon dioxide concentration due to breakthrough of the adsorbent A can be thus detected. Accordingly, when the concentration sensor is electrically connected to the switching valves V5, V6, V7 and the switching valves V5, V6, V7 are set to be automatically switched based on the detected carbon dioxide concentration, switching between the adsorption and the desorption can be performed at an optimal timing such that the adsorption capacity of the adsorbent A is effectively utilized at the maximum.

The liquefaction of carbon dioxide C can be performed by utilizing a compression device for compressing the carbon dioxide C and a cooling device using a heat exchanger, and the liquefaction device can be configured by using these devices. The concentrated or refined carbon dioxide C recovered in the separator SP is liquefied by being cooled to a temperature equal to or lower than the boiling curve, preferably −20 to −50° C. and by being pressurized and compressed. The liquefied carbon dioxide C is preferably prepared in a supercritical state and liquefied carbon dioxide C generally refined to a purity of about 95 to 99% is possibly obtained.

The regeneration system RG which uses the residual gas G' discharged from the separator SP as the regeneration gas includes the flow passage L8 and a heating device for heating the residual gas G' to a high temperature. Specifically, the aforementioned heat exchanger 15 is arranged to perform heat exchange between the gas G in the flow passage L3 and the residual gas G' in the flow passage L8. Since the temperature of the gas G is increased by the pressure applied in the compressor 3, the residual gas G' released from the separator SP is heated by heat exchange through indirect contact with the high-temperature gas G in the heat exchanger 15. The heat exchanger 15 thus cools the compressed gas G in the flow passage L3 while heating the residual gas G' in the flow passage L8 by recovering and utilizing the heat of the gas G. In other words, the residual gas G' serves as a heat medium which carries heat energy of the compressed gas G to the dryer DR. The high-temperature gas G is cooled to about 50 to 70° C. in the heat exchanger 15 and pumped to the dryer DR and the separator SP, The cooled temperature of the gas G can be about 30 to 40° C. or lower depending on the heat exchange rate of the heat exchanger 15. The residual gas G' at about 20 to 40° C. which is returned from the separator SP is heated to about 150 to 200° C. The heat exchanger 15 can be configured by using a known gas-to-gas heat exchanger. The heat exchanger 15 may be of any form such as a counter-flow type, a parallel-flow type, or a crossflow type, and can be appropriately selected from, for example, a static heat exchanger, a rotary regenerative heat exchanger, a periodic flow regenerative heat exchanger, and the like. The heated residual gas G' is supplied to the columns C3, C4 as the regeneration gas and the moisture is thereby released from the used hygroscopic agent H.

The regeneration system RG includes, on the flow passage L8, a heater 17 which is provided downstream of the heat exchanger 15 and a detector 19 which is provided downstream of the heater 17, in order to additionally heat the residual gas G' as necessary. The detector 19 detects the temperature of the regeneration gas to be supplied to the dryer DR. The heater 17 is electrically connected to the detector 19 and is controlled depending on the temperature detected by the detector 19 to heat the residual gas G' obtained after the heat exchange when the temperature of the residual gas G' has not reached a temperature suitable as the regeneration gas. The regeneration gas supplied to the dryer DR is a high-temperature dry gas whose temperature is about 150 to 200° C. and which contains almost no moisture and has a dew point of about −90 to −60° C. The regeneration gas (residual gas G') containing moisture due to the regeneration of the hygroscopic agent H in the dryer DR is discharged from the flow passage L6 to the outside via the pressure regulating valve V9 and a silencer X, and the pressure of the regeneration gas (residual gas G') is released to become the atmospheric pressure. The pressure applied by the compressor 3 is maintained over the dryer DR and the separator SP to the pressure regulating valve V9 in the flow passage L6, and the pressure regulating valve V9 adjusts the pressure of the gas G and the residual gas G'.

The flow rate of the residual gas G' discharged from the separator SP is lower than the flow rate of the gas G supplied to the recovery apparatus 1 by an amount corresponding to the recovered carbon dioxide C. In other words, the larger the amount of carbon dioxide contained in the gas G is, the lower the flow rate of the regeneration gas, that is the residual gas G' is. When the flow rate of the regeneration gas falls, the time required for the regeneration of the hygroscopic agent becomes longer. Accordingly, there may be a case where it is difficult to sufficiently make use of the moisture absorption capacity of the hygroscopic agent. In order to improve this and perform switching between the dehumidification and the regeneration at an optimal timing, it is important that the regeneration gas is supplied at such a flow rate that the hygroscopic agent H can be regenerated in a time shorter than a time required for the hygroscopic agent H in the drying treatment to reach its moisture absorbent capacity. In this respect, the recovery apparatus 1 includes the supplement system SU for supplementing the residual gas G' from the outside by an amount corresponding to shortfall of the residual gas G' as the regeneration gas. The supplement system SU includes a flow passage L10 which supplies a supplement gas N from the outside and a flow regulating valve V10 which is provided in the flow passage L10, and the flow passage L10 is connected to the flow passage L8. An electrically-controllable valve such as an electromagnetic valve is used as the flow regulating valve V10. The flow regulating valve V10 is electrically connected to a flowmeter 21 installed in the flow passage L8 downstream of a connection point between the flow passage L10 and the flow passage L8.

The flow passage L10 is a line which supplies the external supplement gas N to the residual gas G' in the flow passage L8 to supplement the residual gas G'. A gas with a moisture content usable for the regeneration of the hygroscopic agent H, preferably with a moisture amount of about 1 ppm or less is used as the supplement gas N. For example, a nitrogen gas discharged from an oxygen production equipment (ASU: air separation unit) or the like is preferably used as the supplement gas N. It is note that, since the residual gas G' is pressurized, the supplement gas N is supplied at the same pressure as the residual gas G'. The flow regulating valve V10 is controlled depending on the flow rate detected by the flowmeter 21 and adjusts the flow rate of the supplement gas N such that, when the flow rate of the regeneration gas detected by the flowmeter 21 is below the predetermined flow rate, the supplement gas N is supplied to maintain the flow rate of the regeneration gas supplied to the dryer DR at the predetermined flow rate. The supplement gas N is thus added to the residual gas G' from the outside depending on the flow rate of the residual gas G' and the total flow rate of the residual gas G' and the supplement gas N is maintained at the constant flow rate. In this respect, the regeneration is generally preferably performed such that the supply flow rate of the regeneration gas is about 30% to 70% of the supply flow rate of the gas G to the hygroscopic agent H. A flow rate at which such a percentage can be achieved is thus preferably set as the predetermined rate. As described above, the supply flow rate of the regeneration gas is maintained at the predetermined rate by adjusting the supply rate of the supplement gas with the flow regulating valve V10. The regeneration gas is thereby constantly and stably supplied to the dryer DR and the separator SP is avoided from being affected by efficiency decrease in the drying treatment and the regeneration failure of the hygroscopic agent H.

The supply of the regeneration gas can be adjusted based on the difference (G-G') between the flow rate of the gas G at the entrance of the separator SP and the flow rate of the residual gas G' at the exit of the separator SP. In this case, the configuration may be such that detectors which measure the flow rates of the gas G and the residual gas G' at the entrance and exit of the separator SP are provided and the flow rate adjustment valve V10 is controlled based on detection values of these detectors.

If the gas G to be supplied to the aforementioned recovery apparatus 1 is already subjected to water cleaning processing or cooling processing in the other equipment and requires no cooling or removable of unwanted matters, the cooler 11 may be omitted. When the cooling of the gas G needs to be enhanced from the view point of achieving the appropriate temperature in the dryer DR and the separator SP, a cooler is preferably added at an appropriate position such as on the flow passage L4 or the flow passage L5 downstream of the heat exchanger 15, and a water-cooled cooler which uses cooling water at about 5 to 25° C. as coolant can be used to cool the gas G c to a temperature of about 20 to 30° C. or lower.

Moreover, the number of columns containing the hygroscopic agent H in the dryer DR may be appropriately changed depending on the moisture absorption rate, the moisture absorption capacity, the regeneration rate, and the like of the used hygroscopic agent H so as to perform appropriate drying treatment. The separator SP may also have a multistage configuration in which the number of pairs of columns is increased to increase the number of stages of adsorption-desorption processing depending on the separation selectivity of the adsorbent A. This can improve the purity of the recovered carbon dioxide. For example, when a pair of columns similar to the columns C1, C2 is additionally provided on the flow passage L7, the separation performance is improved by adsorptive separation in the second stage. In this case, the residual gas separated from carbon dioxide in the second-stage columns can be preferably returned to adsorptive separation processing in the first-stage columns.

Alternatively, the configuration may be such that a concentration sensor is provided in the flow passage L9 as a detector which detects the carbon dioxide concentration and the recovered carbon dioxide C is returned to the flow passage L5 when the concentration of the recovered carbon dioxide C is low. Low-concentration carbon dioxide is thereby supplied to the columns C1, C2 together with the gas G and the concentration of carbon dioxide obtained from one pair of columns can be increased.

In the aforementioned configuration, a computation processing device such as a CPU may be utilized to manage information detected by the detectors and the sensors while performing automatic control of the switching valves based on the detected information. This enables complex processing such as operation correction through compensation based on the detected information, abnormality response, and the like.

The carbon dioxide recovery method performed in the recovery apparatus 1 configured as described above includes separation processing, drying treatment, regeneration processing, and supplement processing as main processing. In the separation processing, carbon dioxide is separated from the gas by utilizing the adsorption and desorption of carbon dioxide to and from the adsorbent caused by the pressure fluctuation, and the residual gas from which carbon dioxide has been removed is discharged. In the drying treatment, the gas to be supplied to the separation processing is dried by using the hygroscopic agent. In the regeneration processing, the residual gas discharged in the separation processing is supplied to the hygroscopic agent used in the drying treatment, as the regeneration gas to be used for regeneration of the hygroscopic agent. In the supplement processing, the supplement gas is supplied from the outside depending on the flow rate of the residual gas discharged from the separator such that the flow rate of the regeneration gas is the predetermined rate. In detail, the following operations are performed.

The gas G to be supplied is subjected to the cooling processing in the cooler 11 to be cooled to a temperature of about 50° C. or lower, preferably about 40° C. or lower, and it is then pressurized to the pressure at which the separation of carbon dioxide is performed (pressure at which the partial pressure of carbon dioxide in the gas G reaches the adsorption pressure (relatively high pressure)). The pressure generally employed in this pressurization is a pressure at which the adsorption pressure is about 0.3 to 0.6 MPa. The temperature of the pressurized gas G is increased to about 180 to 200° C. and the gas G is subjected to the denitration processing in the denitrator 13 and the cooling by the heat exchanger 15 before being subjected to the separation processing using the adsorbent, to be cooled to a temperature of about 50° C. or lower, preferably about 40° C. or lower, more preferably about 30° C. or lower. Thereafter, the gas G is subjected to the drying treatment by the dryer DR and the moisture content thereof is reduced to about 1 ppm or less.

The gas G subjected to the drying treatment is subjected to the adsorption of carbon dioxide using the adsorbent A in the separator SP and is thereby separated into carbon dioxide C and the residual gas G' (separation processing). The adsorption reaction in which the metal-organic framework adsorbs carbon dioxide is an exothermic reaction and the desorption reaction is an endothermic reaction. Accordingly, the temperature may fluctuate by 20° C. at the maximum due to repeating of the adsorption and the desorption. Thus, in order to achieve quick adsorption of carbon dioxide, it is desirable to maintain the temperature in the adsorption at a low temperature. The gas G to be supplied to the columns C1, C2 in the separation processing is cooled in advance in the heat exchanger 15 as described above. However, if the temperature of the gas G is higher than the temperature suitable for the separation processing, the gas G may be preferably cooled as necessary by utilizing an appropriate cooler provided in the stage prior to the separation processing. The cooling method of the gas G is not limited to a particular method provided that the method involves no humidification, and a method appropriately selected from well-known indirect contact cooling techniques such as water cooling and air cooling may be suitably employed. The gas G can be cooled in an excellent manner by performing water cooling.

In the separation processing, for example, when the gas G with a carbon dioxide concentration of 60%, a temperature of 20° C., and a pressure of 0.6 MPa is supplied to one of the columns C1, C2, the adsorption of carbon dioxide starts at the adsorption pressure of 0.36 MPa. The gas released from this column is discharged via the flow passage L8 as the residual gas G'. The carbon dioxide concentration of the residual gas is extremely low until the adsorption amount of the carbon dioxide approaches the adsorption capacity of the adsorbent A. When the adsorbent A approaches the breakthrough (adsorption saturation), the adsorption rate decreases and the carbon dioxide concentration in the residual gas G' thereby starts to increase. When the adsorbent A reaches the breakthrough, the carbon dioxide concentration of the residual gas G' reaches 60% that is the original carbon dioxide concentration. In the other column, the carbon dioxide adsorbed on the adsorbent A is released by depressurization to the desorption pressure. The pressure is controlled to the desorption pressure of about 0.2 MPa by the pressure regulating valve V8. The concentration of carbon dioxide discharged from the column to the flow passage L7 is increased from 60% by the desorption of carbon dioxide from the adsorbent A, and concentrated carbon dioxide C is recovered from the flow passage L9. It is noted that, since the temperature of the adsorbent A falls due to the endothermic reaction in the desorption, the temperature inside the adsorbent A in the adsorption becomes higher than that in the desorption even when the supplied gas G is cooled to a constant temperature. Hence, the rate at which the adsorbent A takes in carbon dioxide in the adsorption is higher than the rate of release in the desorption and can be generally about 1.2 times the rate of release. Accordingly, the release of carbon dioxide from the adsorbent A on the desorption side substantially continues until the adsorbent A on the adsorption side reaches the breakthrough.

In the separation processing, the carbon dioxide concentration in the gas released from the adsorbent in the desorption can rise from the carbon dioxide concentration in the gas G and reach a purity of 95% (volume percent) or more. For example, when the carbon dioxide concentration in the gas G is about 60% or more, carbon dioxide C concentrated or refined to a concentration of about 90 to 99% can be generally recovered. The configuration may be such that low-concentration carbon dioxide in an initial stage of the desorption is not recovered and the carbon dioxide C is recovered when the concentration of the desorbed carbon dioxide C reaches or exceeds a predetermined concentration. The recovered carbon dioxide is subjected to liquefaction processing as necessary.

As described above, the adsorption and the desorption of carbon dioxide are alternately repeated in the columns C1, C2, and the residual gas G' with a reduced carbon dioxide concentration and the desorbed carbon dioxide C are alternately and repeatedly released from each column. The residual gas G' separated and discharged in the separation processing is used in the regeneration processing as the regeneration gas for the hygroscopic agent used in the drying treatment. In this time, there is performed the supplemental processing of supplying the supplement gas N from the outside depending on the flow rate of the residual gas G' such that the flow rate of the regeneration gas in the regeneration processing is maintained at the predetermined rate. The regeneration gas obtained by appropriately adding the supplement gas N to the residual gas G' is thus prepared. The regeneration gas exchanges heat with the pressurized gas G yet to be subjected to the drying treatment and is heated to become a high-temperature dry gas whose temperature is about 150 to 200° C. and which contains almost no moisture and has a dew point of about −90 to −60° C. The regeneration gas is used to perform the regeneration processing of the hygroscopic agent H used in the drying treatment. Since the heat amount of the pressurized gas G is recovered and utilized as regeneration heat for the hygroscopic agent, the configuration of the present disclosure is excellent in terms of energy utilization efficiency. The regeneration gas containing moisture due to the regeneration processing is discharged to the outside.

The composition of the combustion exhaust gas varies depending on a fuel and a combustion method. The exhaust gas generated by oxygen combustion generally contains about 80% of carbon dioxide, about 10% of nitrogen, and about 10% of oxygen (volume percentages) and, in addition to these, may contain a small amount of water vapor and impurities such as sulfur oxides, nitrogen oxides, chlorine, and mercury. When such a combustion gas is processed as the gas G, carbon dioxide concentrated to a high concentration of about 98% or more can be recovered from the separator SP including the metal-organic framework as the adsorbent. Since the gas G supplied to the separator SP has flowed through the denitrification device 13 and the dryer DR and water vapor and nitrogen oxides are removed therefrom, the residual gas G' discharged from the separator SP contains almost no water vapor and is suitable for use as the regeneration gas in the dryer DR.

Carbon dioxide concentrated or refined to a high purity can be recovered by performing the adsorptive separation of carbon dioxide by using the metal-organic framework with high selective adsorptivity for carbon dioxide. Accordingly, the technique of the present disclosure may be applied to carbon dioxide containing gases other than the exhaust gas. Moreover, the present technique can be utilized for refining of carbon dioxide by utilizing the point that high-purity carbon dioxide can be obtained. If the carbon dioxide concentration of the gas G is low, the recovery apparatus 1 can handle it by increasing the pressure applied in the compressor 3 such that the partial pressure of carbon dioxide in the gas G suitably reaches the preferable adsorption pressure. However, when the pressure of the gas G is increased, the partial pressures of other components (nitrogen, oxygen, and the like) contained in the gas G also increase. Accordingly, adsorption of the other components may progress. In consideration of this, the pressure of the gas G is set within such a range that the adsorption equilibriums of the other components at the partial pressures of the other components are small.

The configurations of the separator SP and the separation processing can be changed as appropriate depending on the condition. For example, the configurations may be changed such that carbon dioxide released from the desorption side with a concentration less than a predetermined concentration is temporarily collected in a storage container and is then separately subjected to another separation processing. Moreover, when the selective adsorptivity of the used metal-organic framework for carbon dioxide is relatively low, the separation processing with the paired columns can be performed in multiple stages as described above to concentrate or refine carbon dioxide and increase the purity thereof. Moreover, multiple pairs of columns may be arranged in parallel to increase the processing capacity of the gas.

Furthermore, changes relating to the fluctuation of the internal temperature of the adsorbent A due to adsorption and desorption can be made to the separator SP. Specifically, piping for indirect heat exchange can be arranged inside the adsorbent A in the columns to cause a heat medium to flow through the piping, or a heat storing material can be disposed inside the adsorbent A. Heating and cooling by the heat medium or absorbing and releasing of heat by the heat storage material can suppress the temperature fluctuation in the adsorbent A. Alternatively, instead of arranging the piping inside the adsorbent A, the separator SP may be changed such that a jacket covering an outer periphery of an adsorption tower is provided so as to heat or cool the adsorbent A from the outside by making a flow of a heat medium through the jacket. The separator SP having such a configuration can handle abrupt temperature fluctuation and suppress, from inside, the temperature rise of the adsorbent A caused by heat actively generated in the adsorption. for example, when the separator SP is employed for refining of relatively high-concentration carbon dioxide.

In the case of separating carbon dioxide from a gas whose nitrogen concentration is relatively high and whose carbon dioxide concentration is relatively low, the configuration may be changed such that the gas is subjected to preprocessing in which the carbon dioxide concentration in the gas is increased in advance by subjecting the gas to adsorption processing using an adsorbent with selective adsorptivity for nitrogen such as crystalline hydrous aluminosilicate alkaline earth metal salt (zeolite). In this case, the nitrogen adsorbed in the preprocessing can be recovered and utilized as the supplemental gas N from the outside in the regeneration of the hygroscopic agent H.

According to the present disclosure, an economically-advantageous carbon dioxide recovery technique is provided, in which carbon dioxide contained in a mixed gas such as a combustion exhaust gas and a process exhaust gas is adsorbed and separated by using the PSA method to efficiently produce carbon dioxide concentrated or refined to high concentration and in which means for generating a negative pressure such as a vacuum pump is not necessary in the apparatus configuration. In the regeneration of the hygroscopic agent used to dry the gas, nitrogen gas discharged in other equipment is effectively utilized. Accordingly, the present disclosure provides a carbon dioxide containing gas processing technique which is useful as comprehensive discharge gas processing in combustion facilities such as thermal power plants, steelworks, and boilers, and can contribute to development of an energy supply technology taking in account of energy saving and environmental protection.

As there are many apparently widely different embodiments of the disclosure that may be made without departing from the spirit and scope thereof, it is to be understood that the disclosure is not limited to the specific embodiments thereof, except as defined in the appended claims.

What is claimed is:

1. A carbon dioxide recovery apparatus, comprising:
   a separator which separates carbon dioxide from a gas by utilizing adsorption and desorption of carbon dioxide to and from an adsorbent caused by pressure fluctuation and discharges a residual gas from which carbon dioxide has been removed;
   a dryer which has a hygroscopic agent for drying the gas to be supplied to the separator;
   a regeneration system which supplies the residual gas discharged from the separator to the dryer as a regeneration gas to be used for regeneration of the hygroscopic agent in the dryer; and
   a supplement system which supplies a supplement gas from an outside to the residual gas depending on a flow rate of the residual gas discharged from the separator such that a flow rate of the regeneration gas is a predetermined rate,
   wherein the supplement system includes:
      a flowmeter which measures the flow rate of the regeneration gas to be supplied to the dryer, and
      a flow regulating valve which is electrically connected to the flowmeter and which adjusts supply of the supplement gas.

2. The carbon dioxide recovery apparatus according to claim 1, wherein the supplement system has a line which supplies a nitrogen gas discharged from an air separation unit as the supplement gas, and the adsorbent in the separator has a metal-organic framework.

3. The carbon dioxide recovery apparatus according to claim 1, wherein
   the separator includes a pressurizer which pressurizes the gas to be supplied to the separator to a pressure at which the adsorbent is capable of adsorbing carbon dioxide, and the supplement system further includes a heat exchanger which exchanges heat between the gas pressurized by the pressurizer and the regeneration gas to be supplied to the dryer, and by the heat exchange in the heat exchanger, the regeneration gas is heated and the pressurized gas is cooled and supplied to the dryer and the separator.

4. The carbon dioxide recovery apparatus according to claim 3, wherein the regeneration gas subjected to the heat exchange by the heat exchanger is the residual gas to which the supplement gas has been supplied.

5. The carbon dioxide recovery apparatus according to claim 3, wherein the separator includes paired columns which contain the adsorbent and a pressure reducer which reduces a pressure in each of the columns to a pressure at which desorption of carbon dioxide adsorbed on the adsorbent is possible.

6. The carbon dioxide recovery apparatus according to claim 5, wherein
the pressurizer includes a compressor which compresses the gas, and
the pressure reducer includes an expander which is configured to cooperate with the compressor.

7. The carbon dioxide recovery apparatus according to claim 1, further comprising a denitrator which removes a nitrogen oxide from the gas to be supplied to the separator.

8. The carbon dioxide recovery apparatus according to claim 7, wherein
the denitrator includes a gas-liquid separator which separates condensate water condensed from the gas, thereby removing the nitrogen oxide contained in the condensate water.

9. A carbon dioxide recovery method, comprising:

separation processing of separating carbon dioxide from a gas by utilizing adsorption and desorption of carbon dioxide to and from an adsorbent caused by pressure fluctuation and of discharging a residual gas from which carbon dioxide has been removed;

drying treatment of drying the gas to be supplied to the separation processing by using a hygroscopic agent;

regeneration processing of supplying the residual gas discharged in the separation processing to the hygroscopic agent used in the drying treatment, as a regeneration gas to be used for regeneration of the hygroscopic agent; and supplement processing of supplying a supplement gas from an outside depending on a flow rate of the residual gas discharged in the separation processing such that a flow rate of the regeneration gas is a predetermined rate, wherein the supplement processing includes:
flow measurement of measuring the flow rate of the regeneration gas to be supplied to the dryer, and
flow regulation of adjusting supply of the supplement gas by using a flow regulating valve depending on the measured flow rate.

* * * * *